Feb. 11, 1936.  LE ROY O. BROWN  2,030,238
TORCH SUPPORT LADLE
Filed May 12, 1933
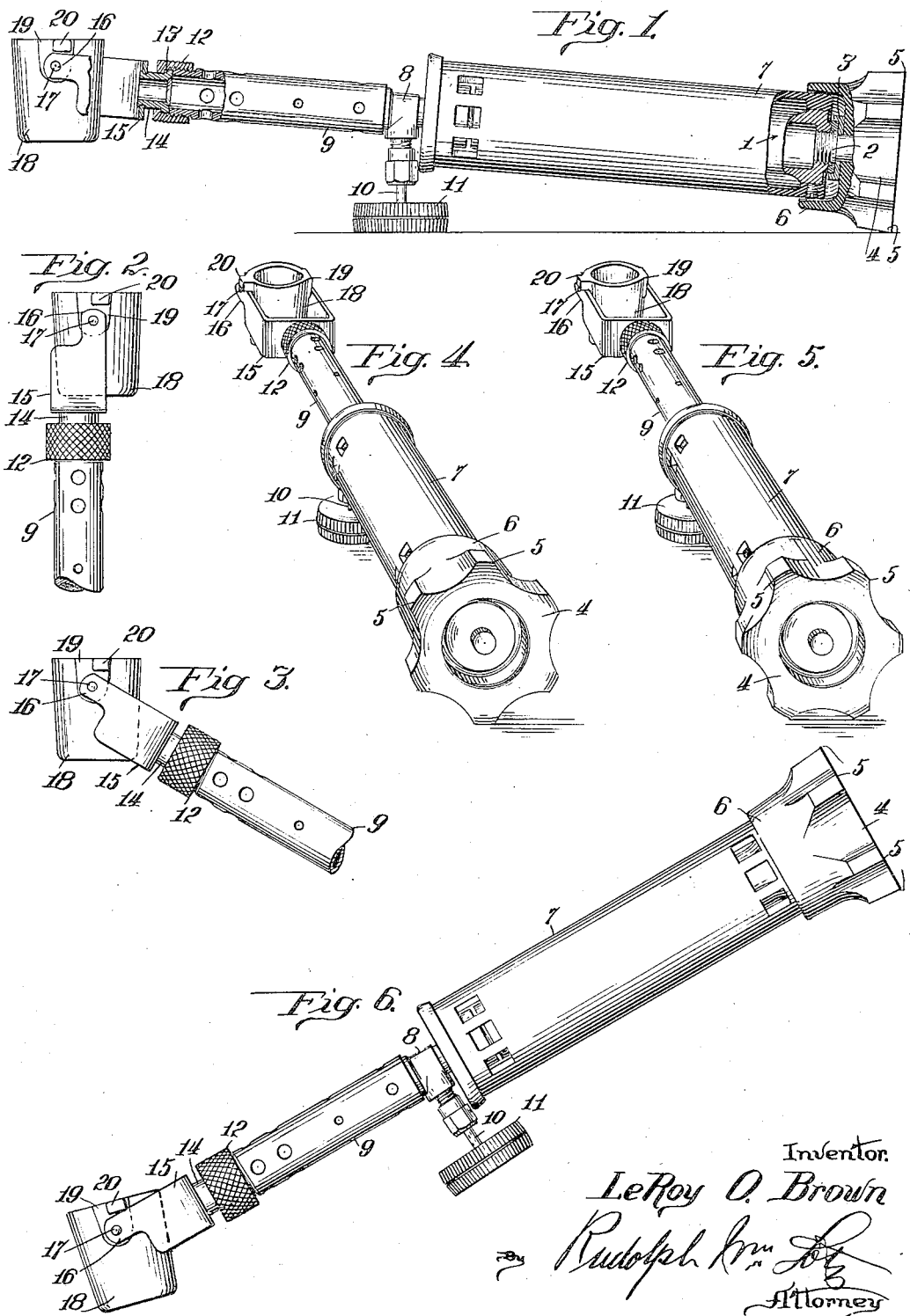
Inventor.
LeRoy O. Brown
Attorney Patented Feb. 11, 1936

2,030,238

UNITED STATES PATENT OFFICE 2,030,238

TORCH SUPPORT LADLE

Le Roy O. Brown, Chicago, Ill., assignor to Justrite Manufacturing Company, Chicago, Ill., a corporation of Illinois Application May 12, 1933, Serial No. 670,656

4 Claims. (Cl. 126—240)

The main object of the present invention is to provide a soldering iron of the type that is heated continuously by means of gas or other combustible fluid, which is equipped with a ladle or receptacle to receive and contain molten solder for use by electricians in soldering together the ends of electrical wires to be joined as by dipping the connected ends of said wires into said ladle or receptacle to receive a coating of the solder.

A further object of the invention is to provide a ladle or receptacle for molten solder, which is disposed always in the path of the flame or heat projecting from the device to maintain said contained solder molten and wherein said receptacle is pivotally mounted for rotation through a sufficient arc to permit the body portion of the device to be manipulated without causing solder to flow from the ladle or receptacle and permitting the body of the device to be disposed in upright or substantially horizontal position without causing spilling of the molten solder in said ladle or receptacle.

A further object of the invention is to provide a self-heating soldering iron of the type referred to, which is equipped with a base plug or filling plug at one end and a controlling valve between its ends which are constructed and arranged for cooperation to support the body of the device in a substantially horizontal position to prevent rolling thereof and the spilling of solder contained in said ladle or receptacle.

Another object of the invention is to provide co-acting means on the ladle or receptacle aforesaid and the contiguous or supporting part of the soldering iron whereby the solder contained in the ladle or receptacle may be poured from the same without causing said solder to pass over any obstructing part of the soldering iron.

A suitable embodiment of the invention is illustrated in the accompanying drawing wherein, Fig. 1 is a view in side elevation partly in central longitudinal section, showing a soldering iron of the type to which the invention relates equipped with a solder containing ladle or receptacle.

Fig. 2 is a fragmentary side elevation of the burner tube of the soldering iron showing the same in upright position and the ladle or receptacle mounted thereon in a corresponding position.

Fig. 3 is a view similar to Fig. 2 showing the same parts in slightly different relative positions.

Figs. 4 and 5 are perspective views showing the soldering iron disposed in substantially the same position as that illustrated in Fig. 1, but looking at the said device from the filling plug end thereof.

Fig. 6 is a side elevation of the soldering iron and ladle or receptacle disposed in position preparatory to turning the body of the device about its own axis for the purpose of pouring solder from the ladle or receptacle.

In the instances illustrated, the soldering iron is of a type which includes a reservoir 1 for a volatile fluid such as gasoline and which is equipped at one end with a filling plug 2 suitably provided with a gasket 3 for effecting a fluid tight joint, said filling plug being equipped with a head 4 of relatively large diameter for a plurality of peripheral projections 5 and which is equipped with an annular flange 6 fitting telescopically over the outer jacket tube 7 disposed around and spaced from the reservoir 1.

A valve 8 controls the flow of volatile fluid from the reservoir 1 and is disposed between the forward end of the said reservoir 1 and jacket tube 7 and the burner tube 9. The stem 10 of said valve is equipped with a hand wheel 11 and said stem 10 is disposed slightly angularly to the longitudinal axis of the reservoir 1 and burner tube 9 for cooperation with the projections 5 of the head 4 of the filling plug to support the device in the position shown in Fig. 1 to assure three points of support for the same, to prevent tipping or rolling of the device.

The outer end portion of the burner tube 9 is threaded externally to receive the union nut 12 which engages the flange 13 of the tubular stem 14 of a U-shaped yoke 15 which is held securely in place and proper position on said burner tube 9 by means of said union nut 12.

The side arms of the said yoke 15 are parallel with each other and are disposed in vertical planes parallel with the axis of the valve stem 10 and with the axis of the burner tube 9. Said side arms terminate in projections 16 in which the trunnions 17 of the ladle or receptacle 18 engage for pivotal connection of said ladle or receptacle with said yoke 15. The pivotal axis of said ladle is perpendicular to the axes of the valve-stem 10 and the burner tube 9, respectively. The said ladle or receptacle 18 is substantially cylindrical and is equipped at diametrically opposite sides with flat bosses 19 from which said trunnions 17 project, said bosses being also equipped with projections 20 constituting stop members for cooperation with the top edges of the side arms of the yoke 15 to limit the pivotal movements of the ladle 18 relative to the yoke 15.

The flame ejected from the burner nozzle or tip controlled by the valve 8 in any of the several positions in which the soldering iron may be disposed to maintain molten the solder contained in said ladle 18. The position of the trunnion 17 with respect to the top and bottom of the ladle 18 is such that said ladle will be maintained in upright or vertical position by gravity, said tendency to retain that position being aided by the weight of the contained solder.

The soldering iron or body portion of the device may be supported upon a table or the like in vertical position upon the head 4 of the filling plug as will be obvious, and, in use, said device may be moved to any point at which the user may desire to dip the joined ends of wires or other devices into the molten solder contained in the ladle for effecting the permanent joining of said wires or the like.

It is desirable in many instances where a vertically disposed device of this character may be easily tipped over, to dispose the same in a horizontal or substantially horizontal position for protection against such contingency. Accordingly, the angle of projection of the valve stem 4 with respect to the longitudinal axis of the reservoir 1 and burner tube 9 is such that if one of the projections 5 of the head 4 is, as shown in Figs. 1 and 4, disposed to rest upon a flat surface, then the hand wheel 11 will lie flatly upon said surface and cooperate with the said projection 5 to provide a plurality of points of support for the soldering iron.

If, on the other hand, as shown in Fig. 5, the head 4 is so disposed that two of said projections 5 rest upon the surface, then the hand wheel 11 will be disposed slightly angularly to the supporting surface and will rest upon the same at only that point which is nearest contiguous to the head 4 and in that event the two projections 5 will cooperate with the point of support of the hand wheel 11 to provide three points of support for the soldering iron.

If one of the projections 5 shall be disposed to one side of the vertical plane of the longitudinal axis of the soldering iron, then relation of the hand wheel 11 and said projection would still be such as to provide a firm support for the device to prevent ready tipping thereof, and cause spilling of solder from the ladle 18.

When it is desired to pour solder from the ladle 18 into another receptacle or upon parts to be soldered together, the body of the device will be disposed in the position shown in Fig. 6, wherein the projection 20 is engaged with the upper edge of a side arm of the yoke 15 is a slightly tilted position in which it will be held by gravity. The body of the device may thereupon be turned about its own axis to effect pouring of the solder from the lip or rim of the receptacle at a point substantially between the forward edge of the flat boss 19 and the forward edge portion of said rim so that in leaving the receptacle, the flow of the solder is not obstructed by any portion of the yoke 15.

It will be understood, of course, that the yoke 15 and ladle 18 may be removed and the customary copper points or head substituted therefor, for purposes of effecting other soldering operations other than those hereinabove referred to.

I claim as my invention:—

1. A soldering device comprising a torch equipped with a heat projecting tube, a yoke rigidly secured to the discharge end portion of said tube and including a pair of parallel arms spaced laterally from each other a distance greater than the diameter of said tube and equi-distantly from the axis thereof, a ladle pivotally secured to said arms on an axis transverse to the longitudinal axis of said tube and adjacent its said axis for positioning said ladle so that it remains completely in the path of heat projected from said tube in all relative positions of said ladle and said tube, and a projection on the ladle disposed to cooperate with one of the arms of said yoke to limit the pivotal movement of said ladle relatively to the said yoke in one direction.

2. A soldering device comprising a torch equipped with a heat projecting tube, a yoke rigidly secured to the discharge end of said tube and including a pair of parallel arms each spaced substantially equally from the axis of said tube, a ladle pivotally secured to said arms on an axis transverse to the longitudinal axis of said tube, thereby positioning said ladle so that it remains completely in the path of heat projected from said tube in all relative positions of said ladle and said tube, and a projection on the ladle disposed to cooperate with the said yoke to limit the pivotal movement of said ladle relatively to the said yoke in one direction, the outer end portions of the said arms being shaped to permit said ladle a pivotal movement approximating one hundred eighty degrees relatively to said yoke.

3. A soldering device comprising a torch equipped with a heat projecting tube, a yoke rigidly secured to the discharge end of said tube and including a pair of arms parallel with and equi-distantly spaced from the axis of said tube, a ladle pivotally secured to the outer ends of said arms on an axis transverse to the longitudinal axis of said tube and adjacent said axis, thereby positioning said ladle so that it remains completely in the path of heat projected from said tube in all relative positions of said ladle and said tube, said ladle and yoke presenting means cooperating with each other for limiting the pivotal movement of the ladle relatively to the yoke to approximately one hundred eighty degrees and for further cooperation to hold said ladle in a given position relatively to the said tube to permit rotation of the latter on its own axis to cause said ladle to be tilted to discharge position.

4. The combination with a torch equipped with means for supporting the same on a flat surface to maintain the longitudinal axis of the torch at an incline to said surface for spacing the flame projecting end thereof from said surface, of a yoke rigidly mounted upon the last-named end of said torch in substantial alignment with the axis of flame projection with its arms spaced laterally out of the zone of flame impingement, a ladle pivotally mounted on said yoke on an axis transverse to and adjacent the axis of flame projection thereby to maintain said ladle disposed completely within the zone of flame projection in all of its positions relatively to said yoke and said torch, said first-named means cooperating with said yoke to maintain said ladle upright during periods of non-use of the device, and a projection on said ladle adjacent its mouth for engagement with said yoke to limit pivotal movement of said ladle relatively to said yoke in one direction, whereby to permit tilting of said ladle as said torch is rotated on its own axis.

LE ROY O. BROWN.